US010678568B2

(12) United States Patent
Ross et al.

(10) Patent No.: US 10,678,568 B2
(45) Date of Patent: Jun. 9, 2020

(54) SYSTEM RESOURCE ALLOCATION IN RESPECT OF DISPLAY INTERFACES

(71) Applicant: International Business Machines Corporation, Armonk, NY (US)

(72) Inventors: Martin A. Ross, Gosport (GB); Caroline J. Thomas, Eastleigh (GB); James Hewitt, Eastleigh (GB); Mark J. Lawrence, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 15/801,655

(22) Filed: Nov. 2, 2017

(65) Prior Publication Data
US 2019/0129728 A1  May 2, 2019

(51) Int. Cl.
G06F 9/44 (2018.01)
G06F 9/50 (2006.01)
(Continued)

(52) U.S. Cl.
CPC ............ *G06F 9/452* (2018.02); *G06F 3/1423* (2013.01); *G06F 9/5016* (2013.01); *G09G 5/001* (2013.01);
(Continued)

(58) Field of Classification Search
CPC .......... G09G 5/006; G09G 5/14; G06F 9/452; G06F 9/5016
(Continued)

(56) References Cited

U.S. PATENT DOCUMENTS 5,838,968 A    11/1998  Culbert
6,430,592 B1   8/2002   Davison
(Continued)

FOREIGN PATENT DOCUMENTS

CN    105893138 A    8/2016
WO    2014039312 A1  3/2014

OTHER PUBLICATIONS

Yegulalp, "Best practices for allocating resources to virtual desktops", Manage, Search Virtual Desktop, Copyright 2008-2017, TechTarget, printed Aug. 11, 2017, 8 pages. http://searchvirtualdesktop.techtarget.com/tip/Best-practices-for-allocating-resources-to-virtual-desktops.

(Continued)

*Primary Examiner* — John Q Chavis
(74) *Attorney, Agent, or Firm* — Jeffrey M. Ingalls

(57) ABSTRACT

A resource allocation system is provided that includes a memory configured to store at least one executable, user-given instruction and a data processor unit operatively coupled to the memory and configured to effectuate running of a given application by executing a corresponding user-given instruction stored in the memory. The system further includes a display interface operatively coupled to the data processor unit and configured to accommodate a given virtual desktop comprising a given application running according to a user-given instruction processed by the data processor unit. The system further includes a policy configurator operatively coupled to the data processor unit and configured to generate a given user-defined policy regarding at least a designated display interface such that a predefined share of a given system resource is allocated to the designated display interface.

16 Claims, 3 Drawing Sheets

(51) Int. Cl.
*G09G 5/14* (2006.01)
*G06F 9/451* (2018.01)
*G09G 5/00* (2006.01)
*G06F 3/14* (2006.01)
*G06F 9/445* (2018.01)

(52) U.S. Cl.
CPC ............ *G09G 5/006* (2013.01); *G09G 5/14* (2013.01); *G06F 9/4451* (2013.01); *G09G 2350/00* (2013.01); *G09G 2370/022* (2013.01)

(58) Field of Classification Search
USPC ........................................................ 718/104
See application file for complete search history.

(56) References Cited

U.S. PATENT DOCUMENTS

| | | | |
|---|---|---|---|
| 7,620,953 B1 | 11/2009 | Tene et al. | |
| 8,949,172 B2 | 2/2015 | Beaty et al. | |
| 2004/0021678 A1* | 2/2004 | Ullah | G06F 9/5027 715/700 |
| 2009/0113173 A1* | 4/2009 | Jaffrey | G06F 9/4411 712/32 |
| 2009/0307597 A1* | 12/2009 | Bakman | G06F 11/008 715/736 |
| 2010/0318637 A1* | 12/2010 | Ly | G06F 9/5083 709/221 |
| 2014/0068627 A1* | 3/2014 | Goh | G06F 1/206 718/105 |
| 2015/0256474 A1 | 9/2015 | Ringdahl et al. | |
| 2015/0365291 A1* | 12/2015 | Burton | H04L 41/0893 709/226 |
| 2016/0246626 A1* | 8/2016 | Kolesnik | G06F 9/45558 |
| 2016/0335131 A1* | 11/2016 | Goh | G06F 1/206 |
| 2017/0033997 A1* | 2/2017 | Burk | G06F 16/2365 |
| 2017/0039674 A1* | 2/2017 | Klosowski | H04L 12/6418 |
| 2017/0053241 A1* | 2/2017 | De Armas | G06F 3/048 |
| 2017/0060558 A1* | 3/2017 | Koushik | G06F 8/61 |
| 2017/0228262 A1* | 8/2017 | Ahmed | G06F 9/5011 |

OTHER PUBLICATIONS

Unknown, "Modifying application priority based on eye tracking", An IP.com Prior Art Database Technical Disclosure, IP.com No. IPCOM000235461D, IP.com Electronic Publication Date: Mar. 3, 2014, 2 pages.

* cited by examiner

SYSTEM RESOURCE ALLOCATION IN RESPECT OF DISPLAY INTERFACES

BACKGROUND

The present invention relates to a computer-implemented method, system and computer program product applicable for system resource allocation in respect of display interfaces.

With the advent of computer-implemented environments in which multiple computer monitor/screen display interfaces may be used and/or accessible by a given user, a higher demand may naturally be placed on system resources. On each display interface, multiple desktops may provide more real estate for placing windows pertaining to applications that may be run on that display interface so this may place an increased demand on system resource consumption by that display interface. Furthermore, applications that may be running in the background are not typically visually displayed to the user so they may continue to consume system resources while not being in active use by the user.

SUMMARY

According to embodiments of the present disclosure, a system for resource allocation is provided. A system includes a memory configured to store at least one executable, user-given instruction and a data processor unit operatively coupled to the memory and configured to effectuate running of a given application by executing a corresponding user-given instruction stored in the memory. The system further includes a display interface operatively coupled to the data processor unit and configured to accommodate a given virtual desktop comprising a given application running according to a user-given instruction processed by the data processor unit. The system further includes a policy configurator operatively coupled to the data processor unit and configured to generate a given user-defined policy regarding at least a designated display interface such that a predefined share of a given system resource is allocated to the designated display interface.

Further described herein are a method and computer program product for providing resource allocation for the system.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
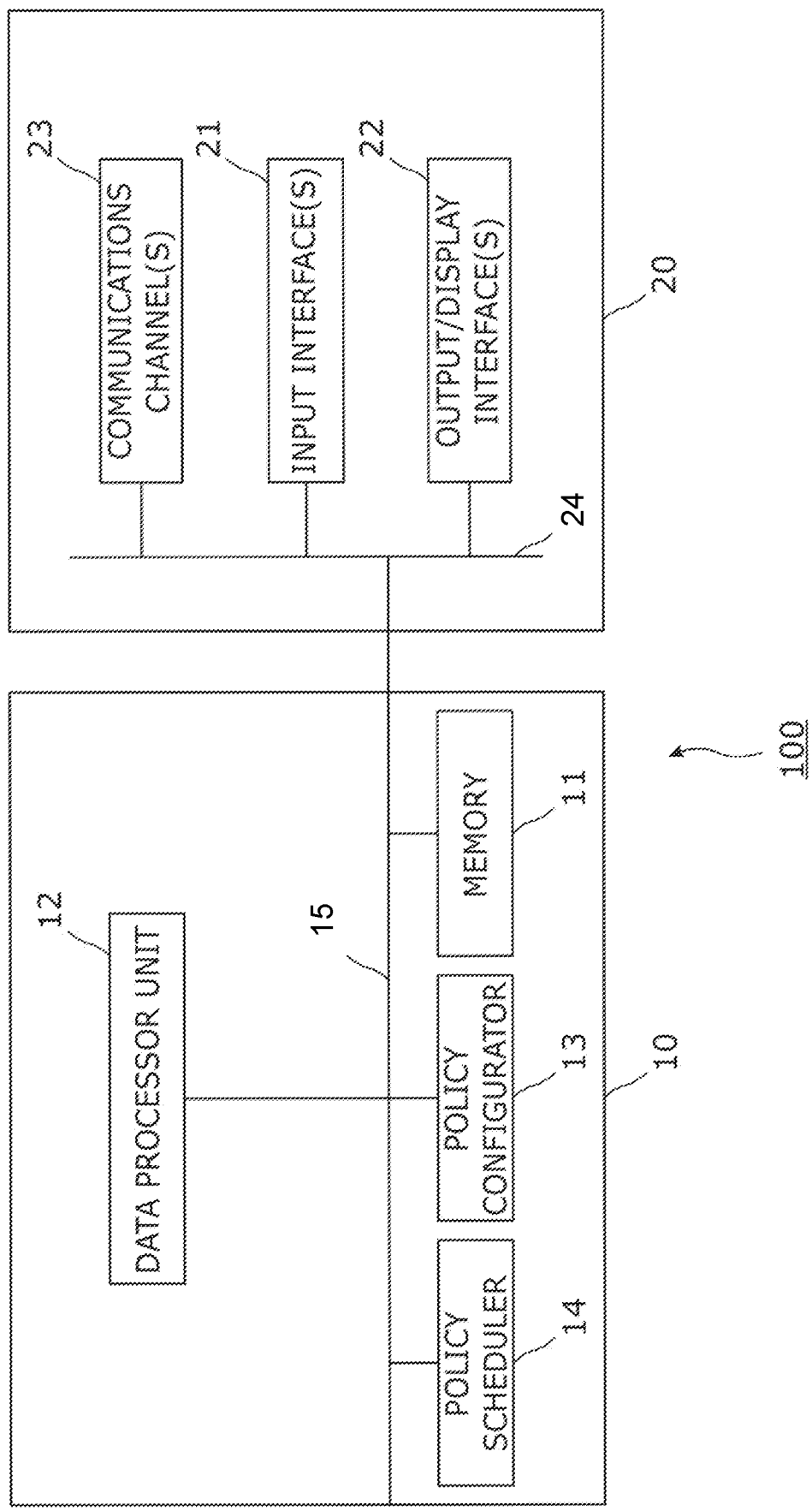
FIG. 1 depicts block diagram of a system according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

According to an embodiment of the present disclosure, there is provided a computer-implemented system for system resource allocation comprising: at least a memory configurable to store at least an executable, user-given instruction; at least a data processor unit that is operatively coupled to the memory and that is configurable to effectuate running of a given application by executing a corresponding user-given instruction stored in the memory, and a given display interface that is operatively coupled to at least the data processor unit and that is configurable to accommodate a given virtual desktop comprising a given application running according to a user-given instruction processed by the data processor unit; the system further comprising: a policy configurator that is operatively coupled to at least the data processor unit and that is configurable to generate a given user-defined policy in respect of at least a designated display interface so that a predefined share of a given system resource is allocated in respect thereof. Some advantages associated with an embodiment of the present disclosure may be that the user is able to control how system resources are allocated for consumption by, and in respect of, any given display interface, and also tailor such allocation according to the consumption demands of given display interfaces.

In some embodiments, there is provided a policy scheduler that is operatively coupled to at least the policy configurator and the data processing unit, which is configurable to generate a given policy-driven instruction, according to a given user-defined policy generated by the policy configurator, thereby to facilitate application of the given user-defined policy in respect of a given designated display interface. This feature may be seen to extend the advantage of providing more user-control in applying a given user-prescribed policy in respect of any given designated display interface in an embodiment of the present disclosure.

In some embodiments, the data processor unit is configurable to facilitate allocation of a predefined share of a given system resource, as specified by a given user-defined policy generated by the policy configurator, in respect of at least a designated display interface. This feature may be seen to extend the advantage of increased operational efficiency to an embodiment of the present disclosure.

In some embodiments, a given system resource comprises usage of at least one of a: central processing unit, memory and power. This feature may be seen to extend the advantages of flexibility and versatility to an embodiment of the present disclosure, since a predefined share of any appropriate, user-chosen system resource may be allocated to a designated display interface.

In some embodiments, the data processor unit is configurable to move a given virtual desktop pertaining to at least one of respective given display interfaces to another of the respective given display interfaces, in response to an assessment being performed of system resource usage by the respective given display interfaces. This feature may provide the advantage that system resources may be freed up for conducting a user's current activity, so that it may be performed relatively faster and with increased efficiency.

In some embodiments, the policy configurator is configurable to generate a given user-defined policy for application to a designated group of display interfaces so that each display interface is allocated a corresponding, predefined share of the given system resource. This feature may be seen to extend the advantage of tailoring system resource allocation according to system resource consumption demand. So, for example, a display interface forming the basis of a user's current activity may be allocated a larger share of a given system resource than other display interfaces operated by the user in the same session.

In some embodiments, the policy configurator is configurable to generate a given user-defined policy for application to given virtual desktops associated with applications running in respect of a given display interface so that each of the given virtual desktops are allocated a corresponding, predefined share of the given system resource. This feature may be seen to extend the advantage of tailoring system resource allocation according to system resource consumption demand. So, for example, a virtual desktop associated with a given application forming the basis of a user's current activity may be allocated a larger share of a given system resource than other virtual desktops associated with background-running applications on the same display interface in a given session.

In some embodiments, the policy configurator is configurable to: generate user-defined policies for respective allocation of a predefined share of a given system resource to each of a given display interface and at least a given virtual desktop associated with a given application running on that given display interface, and to define which of the policies may be run with precedence over the other. This feature presents the advantage that the policy configurator is not limited to generating a user-defined policy for a given display interface; it is configurable to also generate, substantially in tandem, a user-defined policy corresponding to a virtual desktop associated with that display interface. This feature, in addition to the fact that the user may define which of the display policy or virtual desktop policy may take precedence over the other, provides the features of versatility and flexibility to an embodiment of the present disclosure.

In some embodiments, a user-defined policy is configurable thereby to allocate a specific share of a given system resource in respect of at least a designated display interface substantially according to a user-set, priority scaling. This feature may be seen to facilitate tailoring of system resource allocation for any given display interface according to its (predicted) system resource consumption. So, for example, any given display interface in respect of which the user is forecasted to be actively engaged in running a given application that forms the basis of the user's current activity may be allocated a higher share of a user-chosen, system resource than other display interfaces, for example.

In some embodiments, the policy configurator is configurable to generate a given user-defined policy thereby to allocate at least a predefined share of a given system resource to at least a given virtual desktop that is not assigned to any given display interface. An advantage associated with this feature is that system resource allocation may be done in a relatively balanced manner since system resource consumption due to processes that may be performed peripherally to any display interfaces in an embodiment of the present disclosure are inherently accounted for.

The present disclosure has been described purely by way of example and modifications of detail may be made within the scope of the disclosure.

Each feature disclosed in the description and, where appropriate, the claims and drawings may be provided independently or in any appropriate combination.

Within the description, the same reference numerals or signs are used to denote the same parts or the like.

Reference is now made to FIG. 1, which schematically illustrates an embodiment of a computer-implemented system aspect 100 of the present disclosure.

As can be seen from FIG. 1, an embodiment of the system aspect 100 may be arranged in given first and second configurational aspects 10, 20.

As can be seen from FIG. 1, the first configurational aspect 10 may be implemented by the provision of: at least a memory 11 that is configurable to store at least an executable, user-given instruction, and at least a data processor unit 12 that is operatively coupled to the memory 11 and configurable to effectuate running of a given application by executing a corresponding user-given instruction stored in the memory 11.

As can also be clearly seen from FIG. 1, the second configurational aspect 20 may be implemented by the provision of: a given display interface 22 that is operatively coupled to at least the data processor unit 12 and that is generally configurable to accommodate a given virtual desktop comprising a given application running according to a user-given instruction processed by the data processor unit 12. By way of example, the display interface 22 may comprise a display monitor provided as integrated in respect of a given laptop unit or as a standalone component provided externally in respect of a given computer and/or laptop unit. At least a user-accessible, input interface 21 is also provided for the user to compile instructions for storage in the memory 11 and to facilitate user communication with the data processing unit 12, thereby to cause the data processing unit 12 to execute specific user-given instructions stored in the memory 11. In some embodiments, a communications channel 23 is also provided that may facilitate communication with other, externally-provided devices. It may comprise a communication medium that may, for example, generally be wireless media or wired media.

Operative coupling within and between the first and second configurational aspects 10, 20 is facilitated by respectively provided buses 15, 24. Such operative coupling is not limited to the use of buses 15, 24 and may be performed in any other appropriate way within the scope of an embodiment of the present disclosure.

It can be seen that the first configurational aspect 10 also further comprises: a policy configurator 13 that is operatively coupled to at least the data processor unit 12 and that is configurable to generate a given user-defined policy in respect of at least a designated display interface 22 so that a predefined share of a given system resource is allocated in respect thereof. Operatively coupled to at least the policy configurator 13 and the data processing unit 12, there is also provided a policy scheduler 14 that is configurable to generate a given policy-driven instruction, according to a given user-defined policy generated by the policy configurator 13, thereby to facilitate application of the given user-defined policy in respect of a given designated display interface 22 by the data processing unit 12. The data processor unit 12 is configurable to facilitate allocation of a predefined share of a given system resource, as specified by a given user-defined policy generated by the policy configurator 13, in respect of at least a designated display interface 22. Such an allocation may be performed by the data processor unit 12 as prescribed by the given policy-driven instruction/schedule generated by the policy scheduler 14. The policy that is generated by the policy configurator 13 is generated by the user from the outset in terms of a given session of operation of an embodiment of the present disclosure.

Within the context of an embodiment of the present disclosure, a user may typically be engaged in current and/or developmental activity. Current activity encompasses a task that the user is focussed, and currently working, on in a particular session. This is done by the user actively running an application by engaging with its corresponding application window on a given virtual desktop, which is visually displayed on a given display interface 22 accessible to the user. In contrast, a developmental activity relates to an application being run in the background of a given session and it may be performed in tandem with a current activity. Typically, the virtual desktop corresponding to such a background-run application is typically not visually displayed on the display interface 22 that forms the basis of a user-driven, current activity.

Figure 2:
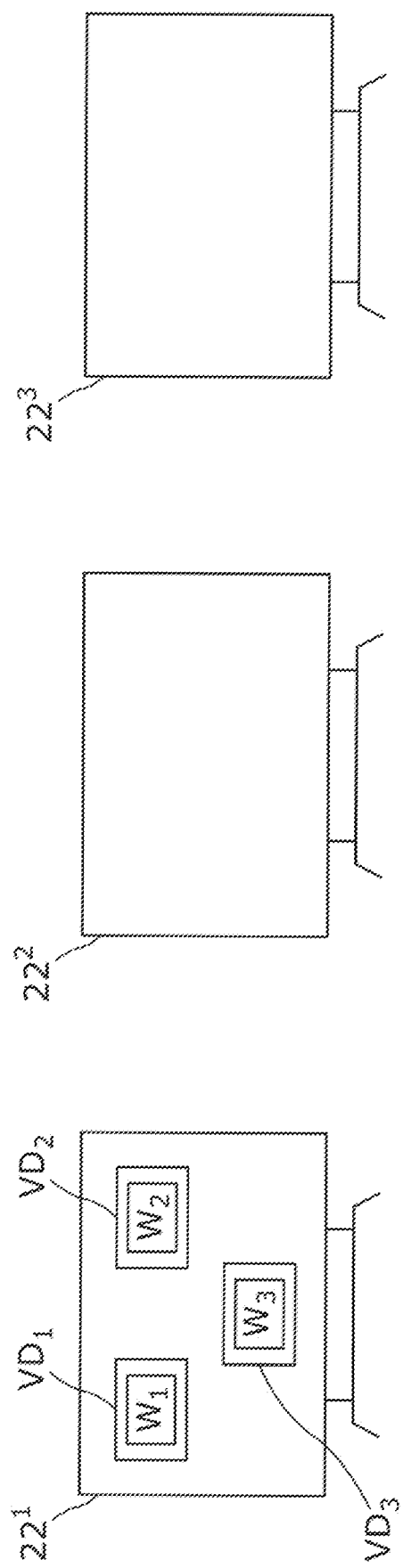
FIG. 2 depicts different modes of operation according to embodiments of the present disclosure.

Reference is now made to FIG. 2, which schematically illustrates different modes of operation of an embodiment of a system aspect of the present disclosure.

Within the framework of an embodiment of the system aspect 100 as hereinabove described with reference to FIG. 1, standalone display interfaces $22^1$, $22^2$, $22^3$ are provided. Applications denoted by application windows $W_1$, $W_2$, $W_3$, which respectively correspond to virtual desktops $VD_1$, $VD_2$, $VD_3$, are run in respect of display interface $22^1$. In the present example, application $W_1$ is run at the fore and forms the basis of the user's current activity, so virtual desktop $VD_1$ is visually displayed on display interface $22^1$. Applications $W_2$, $W_3$ are run in the background and so virtual desktops $VD_2$, $VD_3$ corresponding thereto are not visually displayed on display interface $22^1$ but they still place demands on system resource consumption. For the sake of simplicity, a single application is denoted as running in respect of a given virtual desktop in the example illustrated by FIG. 2. Of course, an embodiment of the present disclosure is not limited to this scenario and in fact multiple applications are typically run per virtual desktop.

As mentioned earlier, the policy configurator 13 is configurable to generate a given user-defined policy in respect of at least a designated display interface 22 so that a predefined share of a given system resource is allocated in respect thereof. In this regard, the user-defined policy may be applied in respect of a given display interface $22^1$, $22^2$, $22^3$ and/or any given virtual desktop $VD_1$, $VD_2$, $VD_3$ corresponding thereto.

Policy Application to Display Interfaces

By way of example, the policy configurator 13 may be configured by the user to generate a policy for application in respect of display interfaces $22^1$, $22^2$, $22^3$ so that they are respectively assigned predefined shares of 70%, 20%, 10% central processing unit (CPU) usage. Subsequently, the policy scheduler 14 generates a policy-driven instruction/schedule, according to the user-defined policy generated by the policy configurator 13, for use in the allocation of such predefined shares of CPU usage to the respective display interfaces $22^1$, $22^2$, $22^3$ by data processor unit 12. Thus, the virtual desktops $VD_1$, $VD_2$, $VD_3$ associated with applications $W_1$, $W_2$, $W_3$ running on display interface $22^1$ have access to 70%, CPU usage and any virtual desktops associated with applications that may (be) run on display interfaces $22^2$, $22^3$ respectively have access to 20%, 10% CPU usage. Operation of an embodiment of the present disclosure is done such that, if the sum of the CPU usage of virtual desktops $VD_1$, $VD_2$, $VD_3$ associated with applications $W_1$, $W_2$, $W_3$ running on display interface $22^1$ reaches the 70%, CPU usage limit defined therefor, any subsequent requests for CPU cycles may be held out and scheduled appropriately so that the 70%, CPU usage limit is not exceeded.

In an embodiment of the present disclosure, the data processor unit 12 is configurable to move any given virtual desktop $VD_1$, $VD_2$, $VD_3$ between respective display interfaces $22^1$, $22^2$, $22^3$ according to a user-given instruction. This may preferably be done in response, but is not limited, to an assessment being performed of usage of a given system resource by the respective display interfaces $22^1$, $22^2$, $22^3$. Thus, and turning to FIG. 2, any one of the virtual desktops $VD_2$, $VD_3$ associated with background-running applications $W_2$, $W_3$ may be moved to any one of display interfaces $22^2$, $22^3$ in response to an assessment that their CPU consumption may cause the 70%, CPU usage limit allocated in respect of display interface $22^1$ to be exceeded. If they are moved, for example, to display interface $22^2$, then they have access to a collective 20% CPU usage allocated to display interface $22^2$, so any applications $W_2$, $W_3$ corresponding to such virtual desktops $VD_2$, $VD_3$ may become less responsive, but such an action would free up more CPU usage on display interface $22^1$ for consumption by any application $W_1$ running on virtual desktop $VD_1$, which forms the basis of the user's current activity. Conversely, if it is assessed that the CPU usage allocated to display interface $22^1$ is not being used to capacity, then part of such CPU usage may be allocated to other display interfaces $22^2$, $22^3$ until it is required again by display interface $22^1$.

Policy Application to Virtual Desktops

In another mode of operation of an embodiment of the present disclosure, the policy configurator 13 may be configurable to generate a user-defined policy for application to each of the virtual desktops $VD_1$, $VD_2$, $VD_3$ associated with applications $W_1$, $W_2$, $W_3$ running on display interface $22^1$ so that they are each allocated a corresponding, predefined share of the CPU usage.

In the example of FIG. 2, application $W_1$ takes precedence over background-run applications $W_2$, $W_3$ since it forms the basis of the user's current activity. Thus, and by way of example, the policy configurator 13 may be configured by the user thereby to generate a policy so that the policy scheduler 14 places an instruction on the data processor unit 12 to allocate 60%, 20%, 20% CPU usage respectively to $VD_1$, $VD_2$, $VD_3$ running on display interface $22^1$.

Policy Application to Display Interface and Virtual Desktop

In yet another mode of operation of an embodiment of the present disclosure, the policy configurator 13 is configurable to: generate user-defined policies for respective allocation of a predefined share of a given system resource to each of a given display interface $22^1$ and at least a given virtual desktop $VD_1$, $VD_2$, $VD_3$ associated with a given application $W_1$, $W_2$, $W_3$ running on that display interface $22^1$, and to define which of the policies may be run with precedence over the other.

By way of example, and with reference to FIG. 2, the policy configurator 13 may be configured thereby to generate a policy so that the policy scheduler 14 places an instruction on the data processor unit 12 to allocate 80% CPU usage to display interface $22^1$ and 20% CPU usage to the virtual desktop $VD_1$ corresponding to application $W_1$ running on display interface $22^1$. The policy configurator 13 is configurable to supplement the policy scheduler 14 with a further instruction that one of these policies is to be applied with preference over the other and any conditions that trigger such preferential policy application. Such preference may be dictated by operational conditions of an embodiment of the present disclosure. For example, from the outset, the user may choose that the virtual desktop policy takes precedence over the display policy where an embodiment of the present disclosure is operated in an environment where multiple virtual desktops are assigned to a single monitor. Alternatively, the display policy may be preferentially applied over the virtual desktop policy if there is a change in an operational environment of the embodiment of the present disclosure that may warrant this, for example, where another monitor is now connected in the previous example.

In this mode of operation, the policy configurator 13 is not limited to prescribing policies in respect of the same system resource for the display interface $22^1$ and a given virtual desktop $VD_1$ associated with any application $W_1$ running on that display interface $22^1$. By way of example, it could be that the policy applied to the display interface $22^1$ is in respect of CPU usage whilst that applied to the virtual desktop $VD_1$ is in respect of memory or power usage and vice versa.

Generally, any policy that is generated by the policy configurator 13 is not limited to a given system resource and is applicable for the allocation of any appropriate system resource, so it could, for example, relate to usage of any one of CPU, power, memory or any other user-defined, system resource. Other system resources that may also be applied individually or in any appropriate combination, also with respect to the aforementioned system resources, include network bandwidth, disk usage and graphics processing unit (GPU).

In an embodiment of the present disclosure, a user-defined policy is preferably configured thereby to allocate a specific share of a given system resource in respect of at least a designated display interface $22^1$, $22^2$, $22^3$ substantially according to a user-set, priority scaling. With reference to the example of FIG. 2 that was made in respect of policy application to display interfaces $22^1$, $22^2$, $22^3$, such priority scaling is evident in that the highest priority 70% for allocation of the CPU usage is given to display interface $22^1$ and is scaled down to 20% for display interface $22^2$ and 10% for display interface $22^3$. Such priority scaling may facilitate allocating more system resources to current activities over developmental activities/background-running applications.

In an embodiment of the present disclosure, the policy configurator 13 may be configured thereby to generate a policy so that the policy scheduler 14 places an instruction on the data processor unit 12 to allocate at least a predefined share of a given system resource to at least a given virtual desktop that is not assigned to/associated with any given display interface. By way of example, and with reference to FIG. 2, virtual desktop $VD_1$ is visually displayed on display interface $22^1$ since it is associated with application $W_1$, which forms the basis of the user's current activity. By virtue of being associated with background-run applications $W_2$, $W_3$, virtual desktops $VD_2$, $VD_3$ remain assigned to display interface $22^1$ but are not visually displayed on it. Additionally, in an embodiment of the present disclosure, there may be at least another virtual desktop that is not assigned to any one of the display interfaces at the outset of a given session, for example, it may be associated with a floating application running on the memory 11. If such an originally-unassigned virtual desktop is later assigned to one of the display interfaces $22^1$, $22^2$, $22^3$, then it will have access to the predefined share of a given system resource as allocated to the host display interface $22^1$, $22^2$, $22^3$ according to the user-defined policy generated in respect thereof by the policy configurator 13. An embodiment of the present disclosure is operated thereby to have an inherent reserve of any given system resource for consumption by any such unassigned virtual desktop. So, with reference to FIG. 2, and by way of example, the user may cause the policy configurator 13 to generate a policy such that 60%, 20%, 10% of CPU usage is allocated to the display interfaces $22^1$, $22^2$, $22^3$ and 10% of CPU usage is always held in reserve/allocated to any virtual desktops that are/remain unassigned to the display interfaces $22^1$, $22^2$, $22^3$ in an embodiment of the present disclosure.

Figure 3:
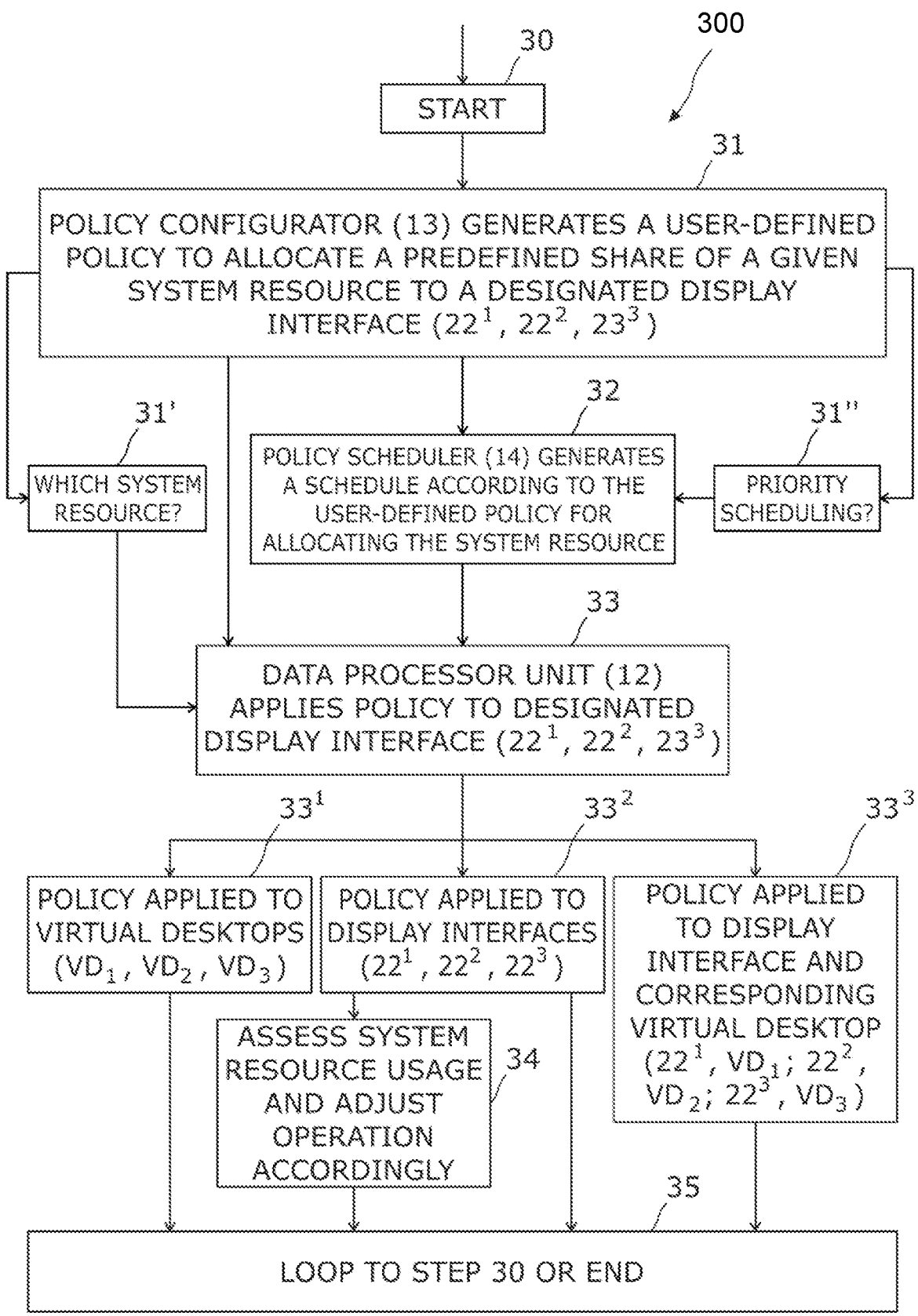
FIG. 3 depicts a flow diagram of a method according to embodiments of the present disclosure.

Reference is now made to FIG. 3, which schematically illustrates an embodiment of a method aspect of the present disclosure. Provided within a framework of such an embodiment are at least those components/aspects of an embodiment of the system aspect 100 as hereinabove described with reference to FIGS. 1 and 2, which interact thereby to perform the steps of an embodiment of the method aspect of the present disclosure.

Turning to FIG. 3, an embodiment of a method aspect 300 of the present disclosure starts at block 30. In response to a specific user-given instruction being generated, the policy configurator 13 is configured at block 31 to generate a given user-defined policy in respect of at least a designated display interface $22^1$, $22^2$, $22^3$ so that a predefined share of a given system resource is allocated in respect thereof. The user-defined policy generated by the policy configurator 13 may also account for, and allocate, a predefined share of the given system resource to any given virtual desktop that is not assigned to/associated with any given display interface $22^1$, $22^2$, $22^3$ of an embodiment of the present disclosure.

Progressing to block 33, the data processor unit 12 is configurable to facilitate allocation of a predefined share of a given system resource, as specified by a given user-defined policy generated by the policy configurator 13, to at least a designated display interface $22^1$, $22^2$, $22^3$. Information on how such allocation is to be performed, which is contained in the user-defined policy generated by the policy configurator 13, may be conveyed to the data processor unit 12: directly from the policy configurator 13, or via a given policy-driven instruction generated at block 32 by the policy scheduler 14 according to the given user-defined policy generated by the policy configurator 13.

A user-defined policy that is generated by the policy configurator 13 at block 31 may comprise information on which system resource is to be allocated in a predefined share to a designated display interface $22^1$, $22^2$, $22^3$ and this information may either be conveyed directly in a sub-step 31', or via the given policy-driven instruction generated at block 32 by the policy scheduler 14, to the data processor unit 12 for execution. In an embodiment of the present disclosure, system resource allocation by the data processor 12 unit is preferably done in respect of usage of at least one of a central processing unit, memory and power, to a given designated display interface $22^1$, $22^2$, $22^3$, but is not limited thereto, and is also extendable to network bandwidth, disk usage and graphics processing unit (GPU), for example.

Returning to block 31, the policy configurator 13 is operable to generate a user-defined policy so as to facilitate allocation of a specific share of a given system resource in respect of at least a designated display interface substantially according to a user-set, priority scaling. Information on such a user-set priority scaling may be conveyed from the policy configurator 13 to the policy scheduler 14 in a sub-step 31" so that it may be accounted for in the policy-driven instruction generated by the policy scheduler 14 at block 32. Such user-set priority scaling has been hereinbefore described with reference to FIG. 2.

From block 33, progress is made to any one of blocks $33^1$, $33^2$, $33^3$ for different modes of operation according to an embodiment of the method aspect 300 of the present disclosure.

The method step performed at block $33^1$ corresponds to "policy application to virtual desktops" as described hereinbefore with reference to FIG. 2. In this mode of operation, the policy configurator 13 is configured to generate a given user-defined policy for application to given virtual desktops $VD_1$, $VD_2$, $VD_3$ associated with applications $W_1$, $W_2$, $W_3$ running in respect of a given display interface $22^1$ so that each of the given virtual desktops $VD_1$, $VD_2$, $VD_3$ are allocated a corresponding, predefined share of a given system resource. In the example of FIG. 2, the policy configurator 13 was configured by the user thereby to generate a policy so that the policy scheduler 14 placed an instruction on the data processor unit 12 to allocate 60%, 20%, 20% CPU usage respectively to $VD_1$, $VD_2$, $VD_3$ running on display interface $22^1$. The largest proportion of CPU usage was allocated to virtual desktop $VD_1$ since it was associated with application $W_1$ forming the basis of the user's current activity.

The method step performed at block $33^2$ corresponds to "policy application to display interfaces" as described hereinbefore with reference to FIG. 2. In this mode of operation, the policy configurator 13 is configured to generate a given user-defined policy for application to a designated group of display interfaces $22^1$, $22^2$, $22^3$, so that each display interface $22^1$, $22^2$, $22^3$ is allocated a corresponding, predefined share of the given system resource. In the example of FIG. 2, By way of example, display interfaces $22^1$, $22^2$, $22^3$ were respectively assigned predefined shares of 70%, 20%, 10% CPU usage.

The method step performed at block $33^3$ corresponds to "policy application to display interface and virtual desktop" as described hereinbefore with reference to FIG. 2. In this mode of operation, the policy configurator 13 is configured to: generate user-defined policies for respective allocation of a predefined share of a given system resource to each of a given display interface $22^1$, $22^2$, $22^3$ and at least a given virtual desktop $VD_1$, $VD_2$, $VD_3$ associated with a given application $W_1$, $W_2$, $W_3$ running on that given display interface $22^1$, $22^2$, $22^3$, and to define which of the policies may be run with precedence over the other. In the example of FIG. 2, the policy configurator 13 was configured thereby to generate a policy so that the policy scheduler 14 placed an instruction on the data processor unit 12 to allocate 80% CPU usage to display interface $22^1$ and 20% CPU usage to the virtual desktop $VD_1$ corresponding to current application $W_1$ running on display interface $22^1$. The policy configurator 13 may be further configured to supplement the policy scheduler 14 with a further instruction that one of these policies is to be applied with preference over the other and any conditions that trigger such preferential policy application.

Depending on a current mode of operation of an embodiment of the method aspect 300, any one of the above-described blocks $33^1$, $33^2$, $33^3$ may be progressed to block 35, which either marks the end of the performance of any steps relating to an embodiment of the method aspect 300 or that a loop may be performed to return to block 30 and to perform the steps subsequent thereto. The user decides which of these routes are to be taken at block 35.

From block $33^2$ pertaining to policy application to display interfaces $22^1$, $22^2$, $22^3$, progression may be made to block 34 before block 35. This may be done in response to an assessment being performed of system resource usage by respective given display interfaces $22^1$, $22^2$, $22^3$. The data processor unit 12 may then be configured to move a given virtual desktop $VD_1$, $VD_2$, $VD_3$ pertaining to at least one of the respective given display interfaces $22^1$ to another of the respective given display interfaces $22^2$, $22^3$. So, if it is assessed that the system resource consumption of background-run applications $W_2$, $W_3$ pertaining to given virtual desktops $VD_2$, $VD_3$ on a given display interface $22^1$ is relatively high and may unduly affect the running of an application $W_1$ that forms the basis of the user's current activity, due to consumption of more than the system resource share allocated to such a display interface $22^1$, then such background-run applications $W_2$, $W_3$ may be moved to another display interface $22^2$, $22^3$.

An embodiment of the system aspect has been described with reference to first and second configurational aspects. The terms "first" and "second" have been used to distinguish, rather than attach an order of importance to, these configurational aspects.

The present invention may be a system, a method and/or a computer program product at any possible technical level of integration. The computer program product may include a computer readable storage medium (or media) having computer readable program instructions thereon for causing a processor to carry out the aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable storage instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages including an object oriented program language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
  a memory configured to store at least one executable, user-given instruction;
  a data processor unit operatively coupled to the memory and configured to run an application by executing a corresponding user-given instruction stored in the memory;
  a plurality of display interfaces operatively coupled to the data processor unit and each of the display interfaces are configured to accommodate a plurality of virtual desktops comprising a given application running according to a user-given instruction processed by the data processor unit; and
  a policy configurator operatively coupled to the data processor unit and configured to generate a given user-defined policy including
    a first policy allocating predefined shares of a given system resource for each of the display interfaces,
    a second policy allocating predefined shares of a given system resource for each of the applications running in the virtual desktops, and
    a third policy specifying at least one operating condition that when changed causes one of the first and second policies to be applied with preference over the other.

2. The system of claim 1, further comprising:
  a policy scheduler operatively coupled to the policy configurator and the data processing unit, the policy scheduler configured to generate a given policy-driven instruction, according to the given user-defined policy generated by the policy configurator, to facilitate application of the given user-defined policy with respect to a given designated display interface.

3. The system of claim 1, wherein the operating condition is the number of display interfaces in the system.

4. The system of claim 1, wherein the given system resource is selected from the group consisting of a central processing unit, memory and power.

5. The system of claim 1, wherein the data processor unit is configured to move a given virtual desktop pertaining to at least one of respective given display interfaces to another of the respective given display interfaces, in response to an assessment being performed of system resource usage by the respective given display interfaces.

6. The system of claim 1, wherein the policy configurator is configured to, in response to a determination that one of the display interfaces is not fully utilizing its allocated share of the given system resource, temporarily reallocate the unutilized portion of said allocated share to another one of the display devices.

7. The system of claim 1, wherein a user-defined policy is configured to allocate a specific share of a given system resource in respect of at least a designated display interface substantially according to a user-set, priority scaling.

8. The system of claim 1 wherein the policy configurator is configured to generate a given user-defined policy to allocate at least a predefined share of a given system resource to at least a given virtual desktop that is not assigned to any given display interface.

9. A computer-implemented method for system resource allocation in a system comprising at least a memory configured to store at least an executable, user-given instruction, at least a data processor unit operatively coupled to the memory and configured to run an application by executing a corresponding user-given instruction stored in the memory, and a plurality of display interfaces that are operatively coupled to at least the data processor unit and each of the display interfaces are configurable to accommodate a plurality of virtual desktops comprising a given application running according to a user-given instruction processed by the data processor unit, the computer-implemented method comprising:
in response to a user-given instruction, generating, by a policy configurator, a given user-defined policy including
a first policy allocating predefined shares of a given system resource for each of the display interfaces,
a second policy allocating predefined shares of a given system resource for each of the applications running in the virtual desktops, and
a third policy specifying at least one operating condition that when changed causes one of the first and second policies to be applied with preference over the other.

10. The method of claim 9, further comprising:
configuring a policy scheduler that is operatively coupled to at least the policy configurator and the data processing unit, generating, by a policy scheduler that is operatively coupled to at least the policy configurator and the data processing unit, a given policy-driven instruction according to the given user-defined policy generated by the policy configurator, to facilitate application of the given user-defined policy in respect of a given designated display interface.

11. The method of claim 9, wherein the operating condition is the number of display interfaces in the system.

12. The method of claim 9, further comprising:
allocating, by the data processor unit, the given system resource to the given designated display interface, the given system resource selected from the group consisting of a central processing unit, memory, and power.

13. The method of claim 9, wherein, in response to an assessment being performed of system resource usage by respective given display interfaces, moving a given virtual desktop pertaining to at least one of respective given display interfaces to another of the respective given display interfaces.

14. The method of claim 9, further comprising:
in response to a determination that one of the display interfaces is not fully utilizing its allocated share of the given system resource, temporarily reallocating the unutilized portion of said allocated share to another one of the display devices.

15. The method of claim 9, wherein the policy configurator generates a user-defined policy according to a user-set, priority scaling.

16. A computer program product for system resource allocation in a system comprising at least a memory configurable to store at least an executable, user-given instruction; at least a data processor unit that is operatively coupled to the memory and that is configurable to run an application by executing a corresponding user-given instruction stored in the memory, and a plurality of display interfaces that are operatively coupled to at least the data processor unit and that are each configurable to accommodate a plurality of virtual desktops comprising a given application running according to a user-given instruction processed by the data processor unit, the computer-program product comprising a computer-readable storage medium having program instructions embodied therewith that are executable to cause: in response to a user-given instruction, configuring of a policy configurator to generate a given user-defined policy
including
a first policy allocating predefined shares of a given system resource for each of the display interfaces,
a second policy allocating predefined shares of a given system resource for each of the applications running in the virtual desktops, and
a third policy specifying at least one operating condition that when changed causes one of the first and second policies to be applied with preference over the other.

* * * * *